US009303618B2

(12) United States Patent
Thomas et al.

(10) Patent No.: US 9,303,618 B2
(45) Date of Patent: Apr. 5, 2016

(54) DEVICE FOR CONVERTING THE MECHANICAL ENERGY FROM THE SWELL OF AN EXPANSE WATER INTO ELECTRIC POWER

(75) Inventors: Pierre Armand Thomas, Puteaux (FR); Fabrice Lessard, Cambrai (FR)

(73) Assignees: COMPAGNIE ENGRENAGES ET REDUCTEURS—MESSIAN—DURAND, Cambrai (FR); D2M CONSULTANTS, La Seyne sur Mer (FR)

( * ) Notice: Subject to any disclaimer, the term of this patent is extended or adjusted under 35 U.S.C. 154(b) by 1005 days.

(21) Appl. No.: 13/497,614

(22) PCT Filed: Sep. 22, 2010

(86) PCT No.: PCT/FR2010/051978
§ 371 (c)(1),
(2), (4) Date: Jul. 20, 2012

(87) PCT Pub. No.: WO2011/036401
PCT Pub. Date: Mar. 31, 2011

(65) Prior Publication Data
US 2012/0280505 A1 Nov. 8, 2012

(30) Foreign Application Priority Data

Sep. 22, 2009 (FR) ...................................... 09 56499

(51) Int. Cl.
F03B 13/10 (2006.01)
F03B 13/12 (2006.01)
F03B 13/18 (2006.01)
(52) U.S. Cl.
CPC ......... F03B 13/186 (2013.01); F05B 2240/917 (2013.01); Y02E 10/38 (2013.01)

(58) Field of Classification Search
CPC ........................................... F03B 13/12–13/26
USPC ................................................ 290/43, 53, 54
See application file for complete search history.

(56) References Cited

U.S. PATENT DOCUMENTS 3,569,725 A * 3/1971 Rosenberg ............ F03B 13/187
290/42
3,664,125 A * 5/1972 Strange ................. F03B 13/187
417/333

(Continued)

FOREIGN PATENT DOCUMENTS

GB          1515744 A        6/1978
NL          1016103 C1       3/2002
WO       2008109062 A1       9/2008

*Primary Examiner* — Tulsidas C Patel
*Assistant Examiner* — Thomas Quigley
(74) *Attorney, Agent, or Firm* — Dowell & Dowell, PC

(57) ABSTRACT

The invention relates to a device (10) which comprises a stationary member (14), comprising a stabilization means (20) relative to the bottom of the expanse of water, a member (16) movable relative to the stationary member (14), comprising at least one floating element (40) intended for remaining on the surface (12) of the expanse of water, such that the swell drives the movement of said movable member (16), a guiding means (17, 18) substantially vertical to the movement of the movable member (16) relative to the stationary member (14), and a generation means (32) for electric power, arranged between the stationary member (14) and the movable member (16), intended for converting into electric power the mechanical energy from the vertical motion of the movable member (16) relative to the stationary member (14).

15 Claims, 10 Drawing Sheets

(56) References Cited

U.S. PATENT DOCUMENTS

| | | | |
|---|---|---|---|
| 4,206,601 A | 6/1980 | Eberle | |
| 4,363,213 A * | 12/1982 | Paleologos | F03B 13/1855 290/53 |
| 4,539,485 A | 9/1985 | Neuenschwander | |
| 5,929,531 A * | 7/1999 | Lagno | F03B 13/262 290/42 |
| 2005/0099010 A1 * | 5/2005 | Hirsch | F03B 13/1845 290/42 |
| 2005/0271501 A1 * | 12/2005 | Walters | F03B 13/1875 415/3.1 |
| 2007/0257491 A1 | 11/2007 | Kornbluh | |
| 2008/0309088 A1 * | 12/2008 | Agamloh | F03B 13/1845 290/53 |
| 2009/0085357 A1 * | 4/2009 | Stewart | F03B 13/16 290/53 |

* cited by examiner

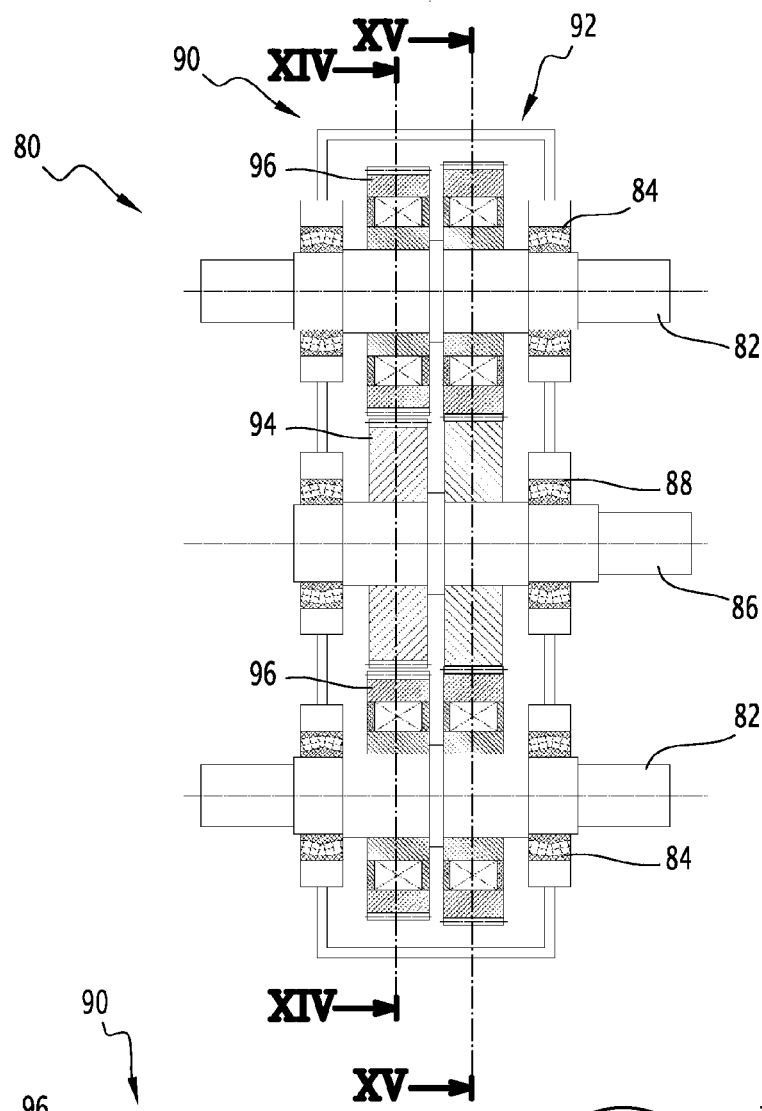
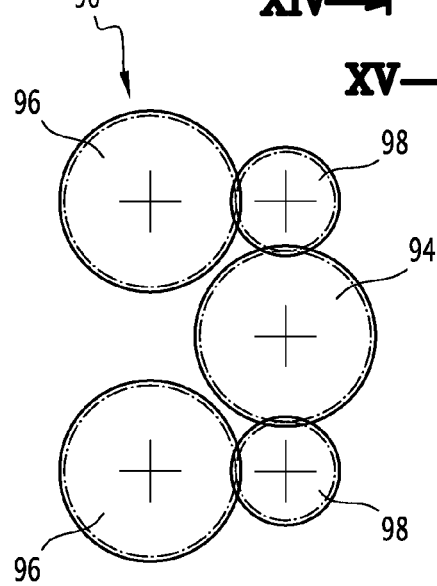
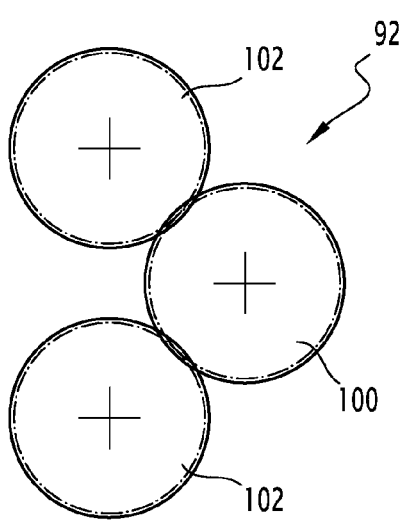
FIG.13
FIG.14     FIG.15

DEVICE FOR CONVERTING THE MECHANICAL ENERGY FROM THE SWELL OF AN EXPANSE WATER INTO ELECTRIC POWER

BACKGROUND OF THE INVENTION

1. Field of the Invention

The present invention relates to a device for converting the mechanical energy from the swell of an expanse of water, such as a sea, into electric power.

2. Description of the Related Art

It is known to use the mechanical energy from an expanse of water to convert it into electric power. To that end, devices are already known for converting the kinetic energy from the hydraulic current into electric power, for example equipping a hydroelectric power station, and devices for converting potential energy from the swell or waves into electric power.

It will be recalled that the energy from the swell, or waves, is created by the friction of the wind on the surface of the expanse of water. This energy of the swell is potential energy, coming from a height difference between the valleys and peaks of the undulations on the surface of the expanse of water.

In the state of the art, devices have already been proposed for converting the mechanical energy from the swell of an expanse of water, such as a sea, into electric power. Such a device usually comprises a substantially stationary member and a movable member relative to the stationary member, intended to be moved by the swell.

Such a device is generally bulky and/or difficult to use.

BRIEF SUMMARY OF THE INVENTION

The invention in particular aims to provide a device for converting the mechanical energy from the swell into electric power that is easy to use, while being stable enough and having optimal efficiency.

To that end, the invention in particular relates to a device for converting the mechanical energy from the swell of an expanse of water, such as a sea, into electric power, comprising:

- a substantially stationary member, comprising a stabilization means relative to the bottom of the expanse of water,
- a member movable relative to the stationary member, comprising at least one floating element intended for remaining on the surface of the expanse of water, such that the swell drives the movement of said movable member,
- a guiding means substantially vertical to the movement of the movable member relative to the stationary member, and
- a generation means for electric power, arranged between the stationary member and the movable member, intended for converting into electric power the mechanical energy from the vertical motion of the movable member relative to the stable member.

In the present description, "vertical" describes a direction parallel to the direction of gravity.

The device according to the invention is easy to use, since the mechanical energy received by that device corresponds directly to the vertical movements of the movable member, in particular the floating element driven by the swell. The movable member being moved vertically, it is its gravitational potential energy that is converted into electric power, by the electric power generation means.

It will be noted that the stabilization means of the stationary member make it possible to keep the guiding means in a substantially vertical direction, so as to optimize the gravitational potential energy of the movable member.

An energy conversion device according to the invention preferably comprises one or more of the following features, considered alone or in combination.

- The energy generation means comprise an electric power generator, including a stator supported by the stationary member, and a rotor supporting a pinion, at least one rack, supported by the movable member substantially vertically, intended to cooperate with the pinion to rotate the rotor when the movable member moves vertically relative to the stationary member.
- The pinion is connected to the rotor by a free wheel mechanism supporting a flywheel.
- The device comprises a system for driving the rotor by means of the pinion, comprising: at least one input shaft connected to the pinion, an output shaft, connected to the rotor, first meshing means, comprising a first toothed wheel integral with the output shaft, and a first toothed free wheel arranged on the input shaft, and an intermediate pinion meshing with the first toothed free wheel and the first toothed wheel, the first toothed free wheel being adapted to rotate the intermediate pinion when the input shaft is rotated in a first direction of rotation, and to turn freely when the input shaft is rotated in a second direction of rotation opposite the first, and second meshing means, comprising a second toothed wheel, integral with the output shaft, and a second toothed free wheel, arranged on the input shaft, and meshing with the second toothed wheel, the second toothed free wheel being adapted to rotate the second toothed wheel when the input shaft is rotated in the second direction of rotation, and to turn freely when the input shaft is rotated in the first direction of rotation.
- The movable member comprises a hollow tubular element, inside which the mast is housed, the hollow tubular element being delimited by an inner wall supporting the rack.
- The guiding means comprise at least one substantially vertical mast, supported by the stationary member, and at least one complementary guiding element, supported by the movable member, forming a substantially vertical sliding connection with the mast.
- The mast is hollow, and comprises a passage for an electric output cable of the electric power generator.
- The stabilization means comprises an anchoring means at the bottom of the expanse of water.
- The anchoring means comprises at least one anchoring line secured to an upper end of the mast, and extending along the mast as far as a lower end of the mast.
- The stabilization means comprises a damping base arranged at a lower end of the mast, and a ballast mass secured to the mast.
- The stationary and movable members include complementary end-of-travel stops limiting the relative vertical movement of said stationary and movable members between deployed and retracted positions.
- The energy conversion device comprises motor-driven means intended to actuate the pinion so as to move the movable member toward the deployed position or the retracted position, the motor-driven means preferably being made up of the power generating means operating as a motor.
- The buoyancy of the floating element is approximately equal to twice its weight, the floating element preferably having a general flat and circular or polygonal shape.

At least one crosspiece connects the floating element to the guiding element, said crosspiece comprising a rod, connected to the guiding element using a pivot link, and sliding in a guide bush, said guide bush being connected to the periphery of the floating element using a pivot link, so that the length of the crosspiece is adjustable.

The floating element comprises a peripheral partition, extending substantially vertically from said floating element, and delimiting an enclosure with said floating element and the mast, said enclosure being open on top.

The peripheral partition comprises openings each provided with a check valve, allowing the passage of water from the enclosure to the outside, and prohibiting the passage of water from the outside into the enclosure through said openings.

BRIEF DESCRIPTION OF THE DRAWINGS

The invention will be better understood upon reading the following description, provided solely as an example and done in reference to the appended figures, in which:

FIG. 13 is an axial cross-sectional view of a drive system equipping the electric power generation means, according to a second alternative; and FIGS. 14 and 15 are transverse cross-sectional views, along arrows XIV and XV, respectively, of the drive system of FIG. 13.

FIG. 1 shows a device 10 for converting the mechanical energy from the swell of an expanse of water, such as a sea or an ocean, into electric power. The surface of the expanse of water is designated by reference 12.

DETAILED DESCRIPTION OF THE INVENTION

Figure 2:
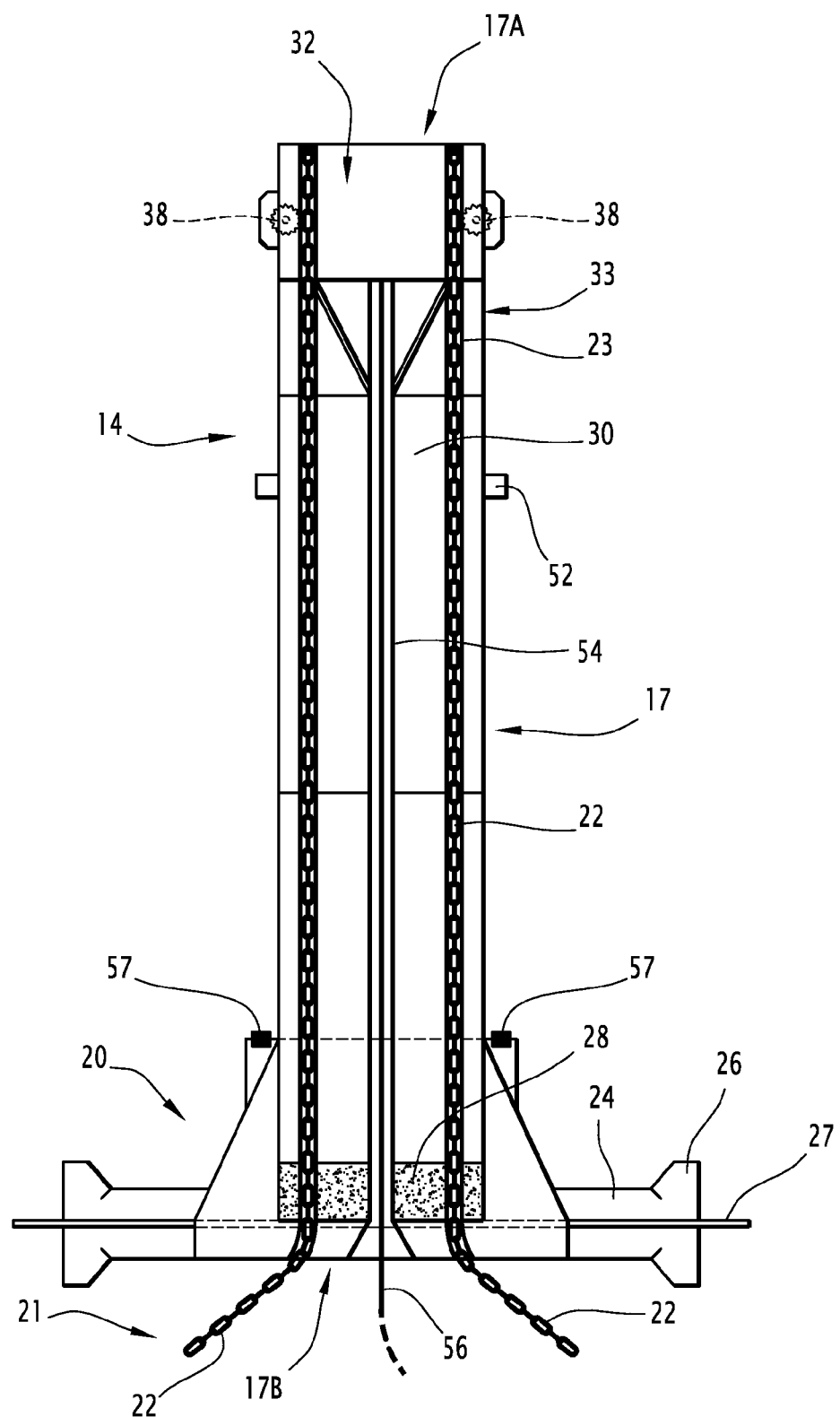
FIG. 2 is a view similar to FIG. 1 of a stationary member of the device of FIG. 1.
Figure 3:
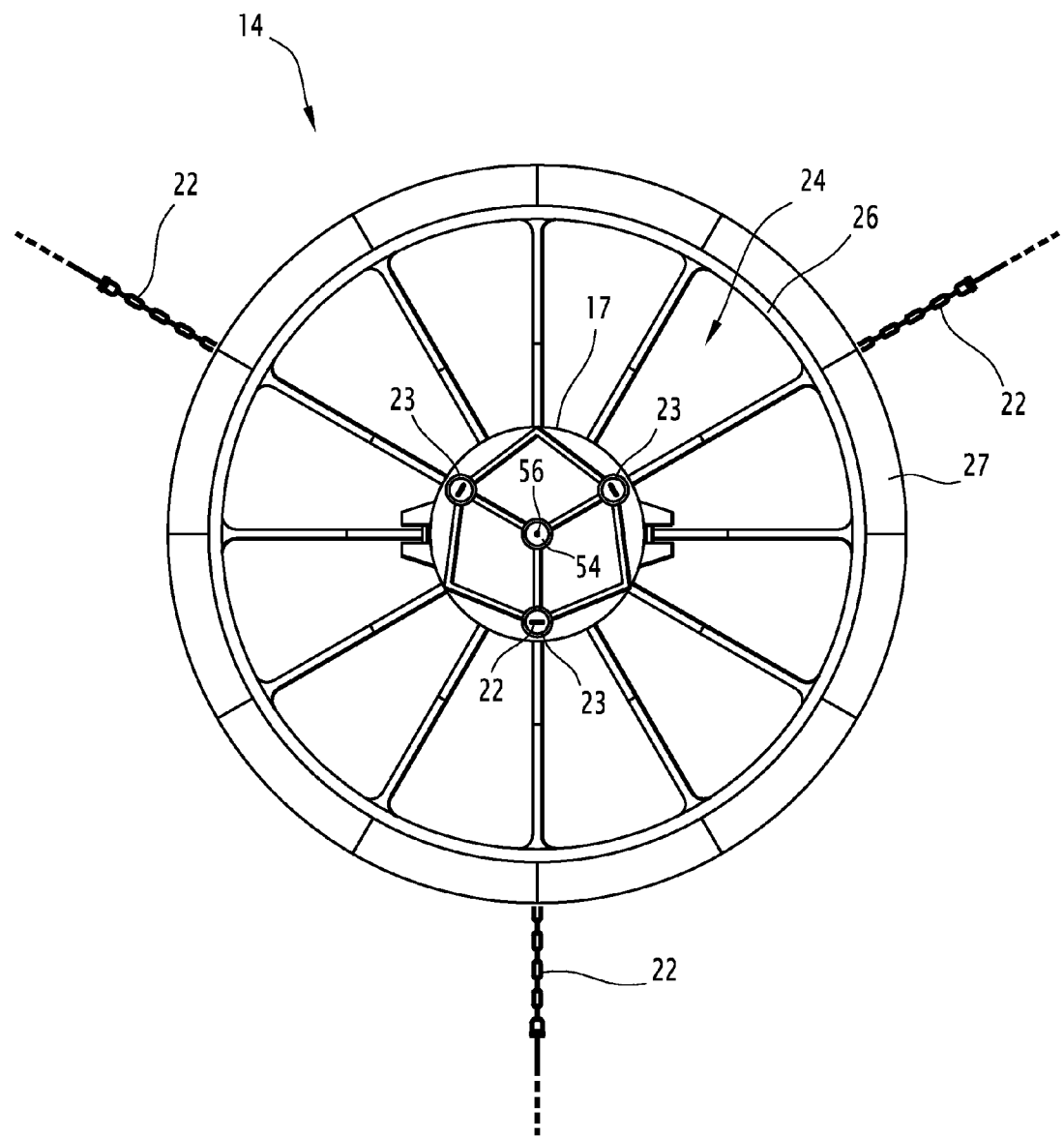
FIG. 3 is a top view of the stationary member of FIG. 2.
Figure 4:
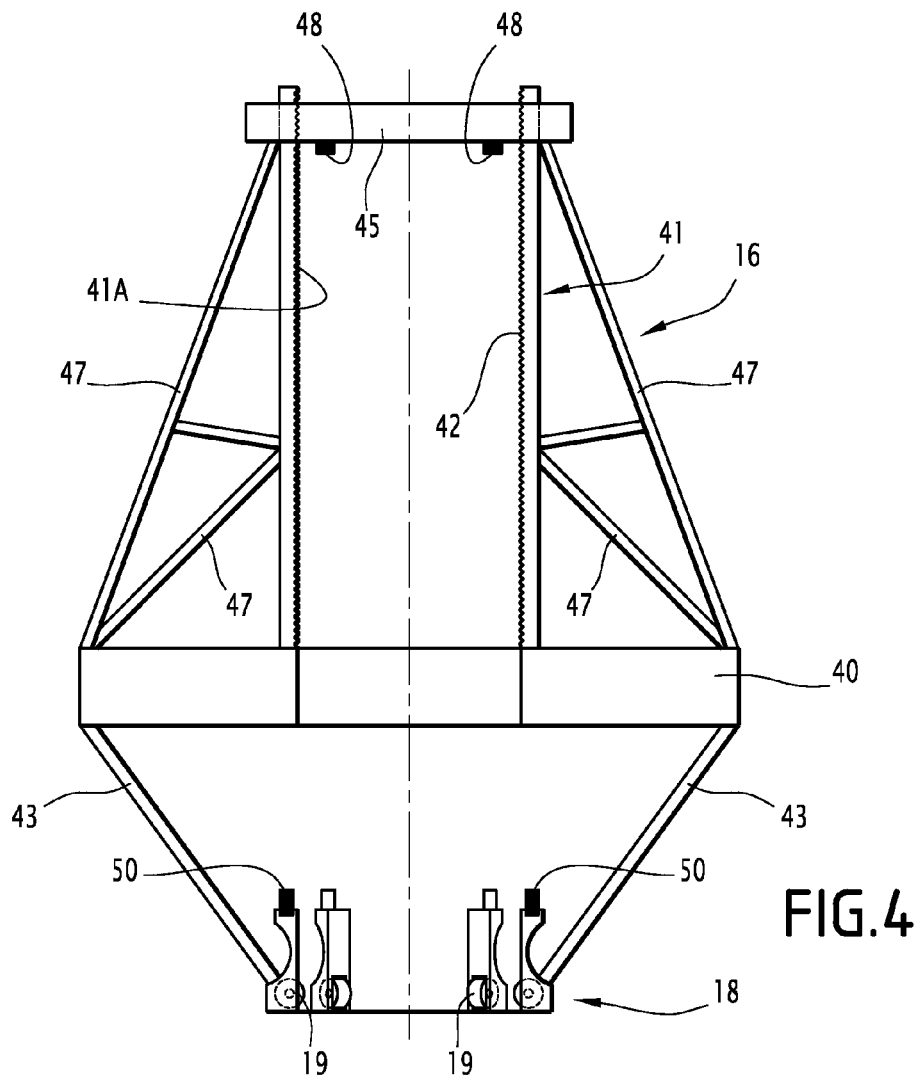
FIG. 4 is a longitudinal cross-sectional view of a movable member of the power conversion device of FIG. 1.
Figure 5:
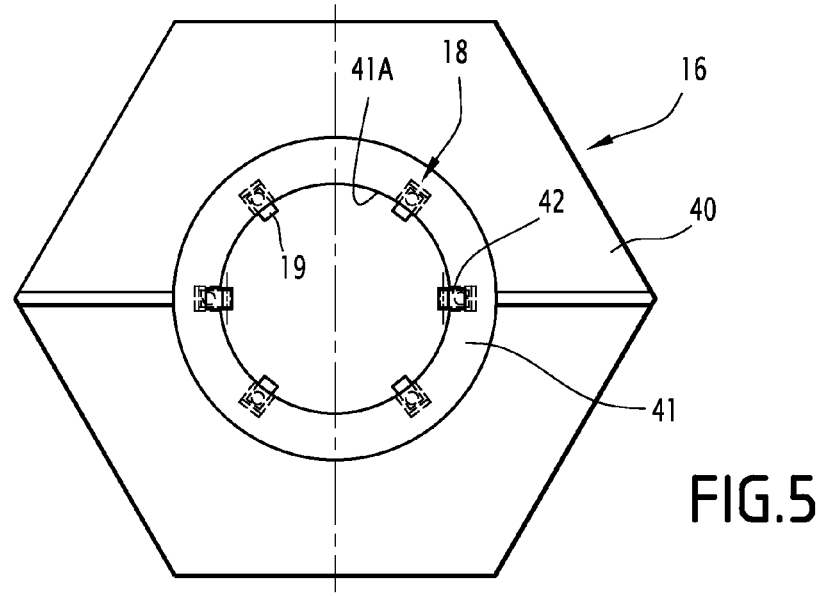
FIG. 5 is a top view of the movable member of FIG. 4.

The conversion device 10 comprises a substantially stationary member 14, shown in more detail in FIGS. 2 and 3, and a member 16 movable relative to the stationary member 14, shown in more detail in FIGS. 4 and 5.

The stationary member 14 comprises a mast 17 with a substantially vertical axis, along which the movable member 16 is intended to move, as a function of the swell of the expanse of water.

To that end, the movable member 16 comprises a guiding element 18, cooperating with the mast 17 so as together to form a substantially vertical guiding means for the movement of the movable member 16 relative to the stationary member 14. In this way, the mast 17 and the guiding element 18 together form a substantially vertical slide connection. The guiding element 18 for example comprises castors 19, intended to roll on an outer wall of said mast 17.

It will be noted that the movable member 16 may indifferently comprise an annular guiding element 18, comprising castors 19 distributed on the periphery of the mast 17, for a plurality of guiding members 18 distributed on the periphery of the mast 17, each comprising a castor 19.

The movable member 16 also comprises at least one floating element 40 that will be described later.

The stationary member 14 comprises stabilization means 20 relative to the bottom of the expanse of water, intended to keep the member 14 substantially stationary and the mast 17 substantially vertical, in particular in case of choppy water.

The stabilization means 20 comprises an anchoring means 21 to the bottom of the expanse of water, comprising at least one, preferably three, anchor lines 22 intended to be anchored to the bottom of the expanse of water. In order to guarantee optimal stability, each anchor line 22 is secured to an upper end 17A of the mast 17, and extends along said mast 17 as far as a lower end 17B of said mast 17. For example, the mast 17 is hollow and comprises a passage 23 for each anchor line 22 over the entire length thereof.

Each anchor line 22 is formed by a chain, or by any other suitable member.

Preferably, the stabilization means 20 also comprises a damping base 24. Preferably, the damping base 24 is symmetrical relative to the axis of the mast 17, and is for example generally circular, as illustrated in FIG. 2, or polygonal.

The damping base 24 preferably comprises a peripheral skirt 26 intended to contain the driven water mass, associated with the base 24 so as to increase the mass inertia of that base 24, and therefore to limit the vertical movements thereof.

Furthermore, the base 24 has a large enough diameter to perform a hydrodynamic damping function in the vertical direction, which limits the travel of the mast 17 relative to said vertical direction. In fact, such movement of the mast 17 is damped, therefore significantly reduced, by the resistance and the mass of the water cooperating with the base 24.

In order to optimize this damping, the base 24 is preferably extended at the periphery thereof by a lip 27.

The stabilization means 20 also comprises a ballast mass 28 supported near the lower end 17B of the mast 17. For example, the ballast mass 28 is a solid mass, or a reservoir containing a liquid mass with a density higher than that of the water.

Lastly, the stabilization means 20 comprises a sealed reservoir 30, in particular shown in FIG. 2, supported by an upper portion of the mast 17. The sealed reservoir 30 is filled with a fluid having a lower density than that of the water, for example air, so that said sealed reservoir 30 offsets the weight of the stationary member 14, and thereby ensures the flotation thereof, preventing it from leaking when it is submerged in the water.

The stationary member 14 supports electric power generation means 32, intended to be arranged between the stationary member 14 and the movable member 16, so as to convert into electric power the mechanical energy resulting from the vertical movement of the movable member 16 relative to the stationary member 14.

Figure 6:
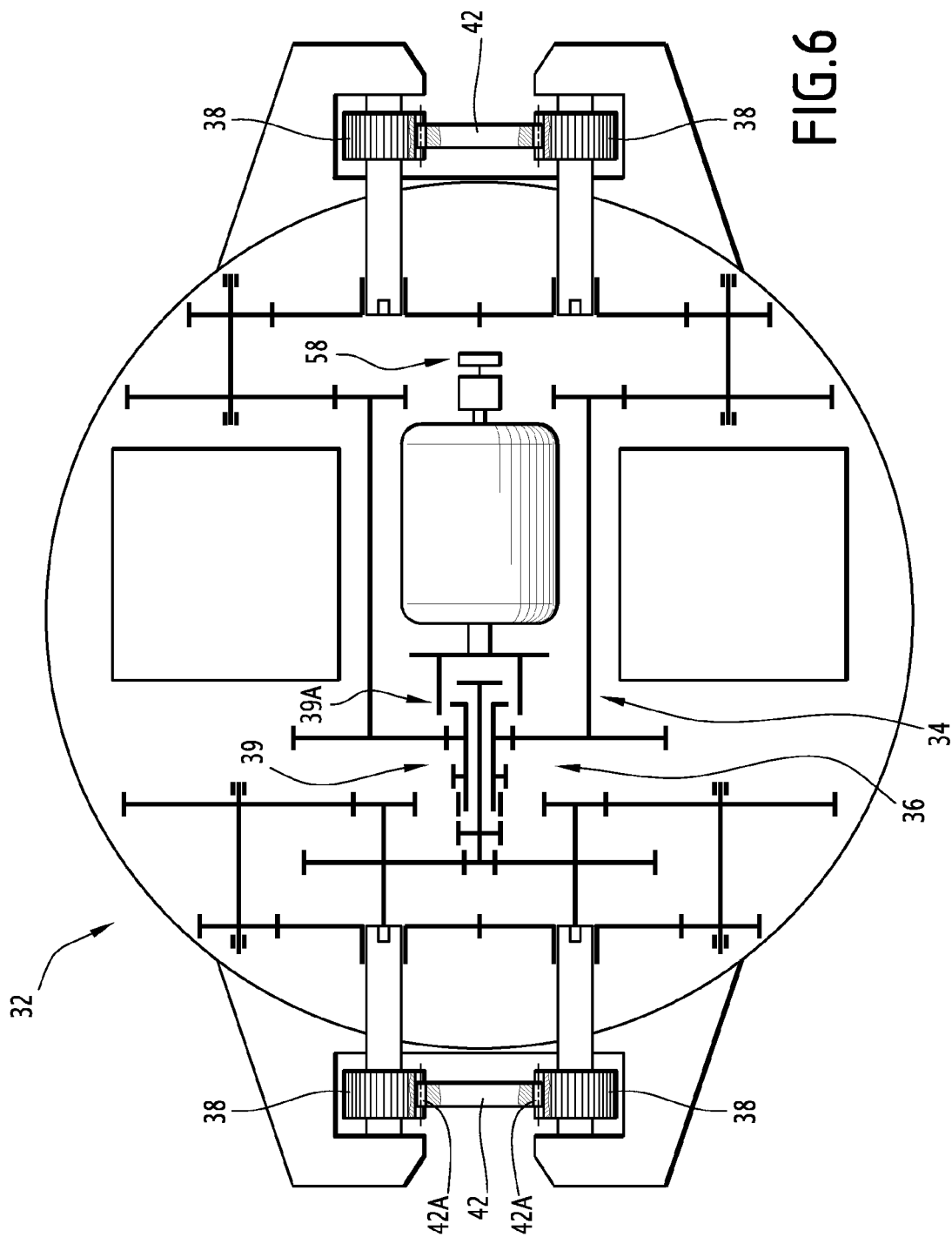
FIG. 6 is a diagrammatic top view of an electric power generation means of the power conversion device of FIG. 1, according to a first alternative.

The electric power generation means 32, shown in more detail in FIG. 6, is supported by the mast 17 above the sealed reservoir 30.

The mast 17 comprises, between the compartment 30 and the electric power generation means 32, a structure 33 with a low buoyancy, intended to minimize the vertical excitation forces generated by the passage of the swell or waves.

The power generation means 32 in particular comprise a traditional electric power generator, comprising a stator 34 supported by the mast 17 and a rotor 36 kinematically connected to at least one, preferably two pairs of pinions 38.

Preferably, each pair of pinions 38 is connected to the rotor 36 by a free wheel mechanism 39, supporting a flywheel 39A. The free wheel mechanisms 39 associated with the pairs of pinions 38 are preferably separate, and opposite, such that the rotor 36 is rotated by one or the other of the pairs of pinions 38, as a function of their direction of rotation.

According to the illustrated embodiment, the power generator comprises a single rotor 36, to which both pairs of pinions 38 are connected. Alternatively, the power generator could comprise two rotors, each being connected to a separate pair of pinions.

As shown in FIGS. 4 and 5, the floating element 40 is intended to float on the surface 12 of the expanse of water, such that the swell moves the movable member 14, in the vertical direction along the mast 17 owing to the guiding means 17, 18.

The floating element 40 for example has a general flat shape, preferably circular or polygonal, as illustrated in FIG. 5.

Preferably, the buoyancy of the floating element 40 is approximately equal to twice its weight, so as to be able to be driven vertically optimally upward upon passage of a swell, and downward after the passage of said swell. It will be recalled that buoyancy is a vertical force, oriented from bottom to top, that a fluid exerts on a submerged object. The buoyancy of the floating element 40 depends in particular on its density and shape.

The floating element 40 is connected to the guiding element 18 using crosspieces 43. For example, each crosspiece 43 is formed by a rigid rod, extending between the periphery of the floating element 40 and the guiding element 18, as shown in FIG. 4.

Figure 1:
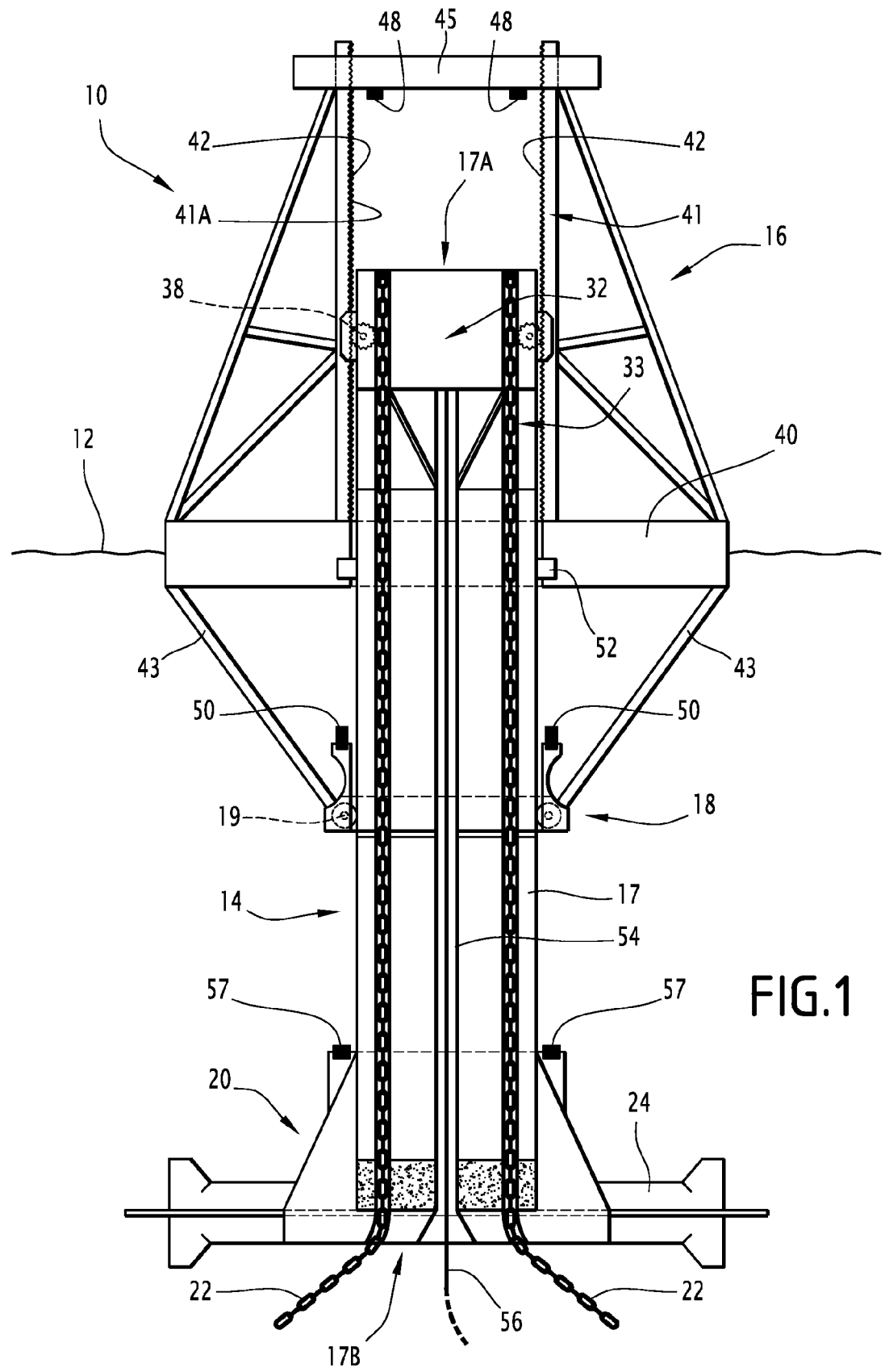
FIG. 1 is a longitudinal cross-sectional view of an energy conversion device according to a first embodiment of the invention.

The movable member 16 comprises a hollow tubular element 41, inside which the mast 17 is housed, as shown in FIG. 1. The hollow tubular element 41 is integral, at the lower end thereof, with the floating element 40, and integral, at the upper end thereof, with an annular stiffening member 45.

The hollow tubular element 41 is delimited by an inner wall 41A supporting at least one, preferably two racks 42, each intended to mesh with a pair of pinions 38, so as to rotate the rotor 36 when the movable member 16 moves vertically, relative to the stationary member 14, along the mast 17.

According to the illustrated embodiment, each rack 42 has a generally rectangular parallelepiped shape extending parallel to the mast 17, in particular comprising a longitudinal surface fastened to the inner wall 41A of the hollow tubular element 41, and two side surfaces, adjacent to the longitudinal surface, each bearing a toothing 42A intended to cooperate with one of the pinions 38, as illustrated in FIG. 6. Such a rack 42 is said to have a double toothing.

Alternatively, each rack could comprise a single toothing formed on a second longitudinal surface opposite that which is secured to the inner wall of the hollow tubular element 41. Such a rack 42 is said to have a single toothing. In that case, each rack would only cooperate with a single pinion of the power generation means 32.

The tubular element 41, combined with the guiding element 18, makes it possible to keep the floating element 40 perpendicular to the mast 17. In fact, the pinions 38, which cooperate with the racks 42, also perform vertical guiding of the movable member 16 relative to the stationary member 14.

Preferably, the movable member 16 comprises reinforcing elements 47, in particular made up of crosspieces 47 extending between the annular stiffening member 45 and the periphery of the floating element 40, and/or between the hollow tubular element 41 and the periphery of the floating element 40.

In order to ensure that the stationary 14 and movable 16 members do not come apart, said stationary 14 and movable 16 members comprise complementary end-of-travel stops, limiting their relative vertical movement.

In particular, the movable member 16 comprises upper end-of-travel stops 48, supported by the annular stiffening element 45, intended to cooperate with first complementary stops supported by the upper end 17A of the mast 17 when the movable member 16 is at its lowest relative to the stationary member 14. The movable member 16 also comprises lower end-of-travel stops 50, intended to cooperate with second complementary stops 52 supported by the mast 17, when the movable member 16 is at its highest relative to the stationary member 14.

Preferably, the upper 48, lower 50, and complementary 52 stops are made from rubber, which makes it possible to dampen any impact between the stops at the end of travel.

The invention makes it possible to supply the electric power generator 34 with mechanical energy simply. The swell moves the floating element 41 the mast 17 owing to the vertical guiding means, the racks 42 then rotating the pinions 38, which in turn drive the rotor 36. The mechanical energy thus recovered by the rotor 36 is converted into electric power by the generator 34.

In order to transfer the electric power, the mast 17 preferably comprises a passage 54 for an electric cable 56, making it possible to convey the electric power, for example toward at least one storage battery.

It will be noted that the opposite free wheel mechanisms 39, and the flywheel 39A, make it possible to ensure constant driving of the rotor 36.

In this way, when the movable member 16 moves upward, the racks 42 rotate the pairs of pinions 38 in a first direction. A first pair of pinions 38 then rotates the rotor 36, while a second pair of pinions 38 rotates freely.

Then, when the movable member 16 moves downward, the racks 42 rotate the pairs of pinions 38 in a second direction. It is then the second pair of pinions 38 that rotates the rotor 36, and the first pair of pinions 38 rotates freely.

Furthermore, the flywheel 39A makes it possible to rotate the rotor 36 even when the movement of the movable member 16 relative to the movable member 14 changes directions, thereby canceling its speed.

In fact, when the movable member 16 moves, part of the mechanical energy provided is stored by the flywheel 39A. When the movement of the movable member 16 changes directions, said free wheel prevents the rotational blocking of the rotor 36, said rotor 36 being rotated by the flywheel 39A, which releases stored mechanical energy.

It will be noted that the device 10, the movable member 16 of which moves only substantially vertically, is not very bulky in the horizontal directions. In this way, it is possible to have a large number of devices 10 on an expanse of water, with a high surface density.

Figure 7:
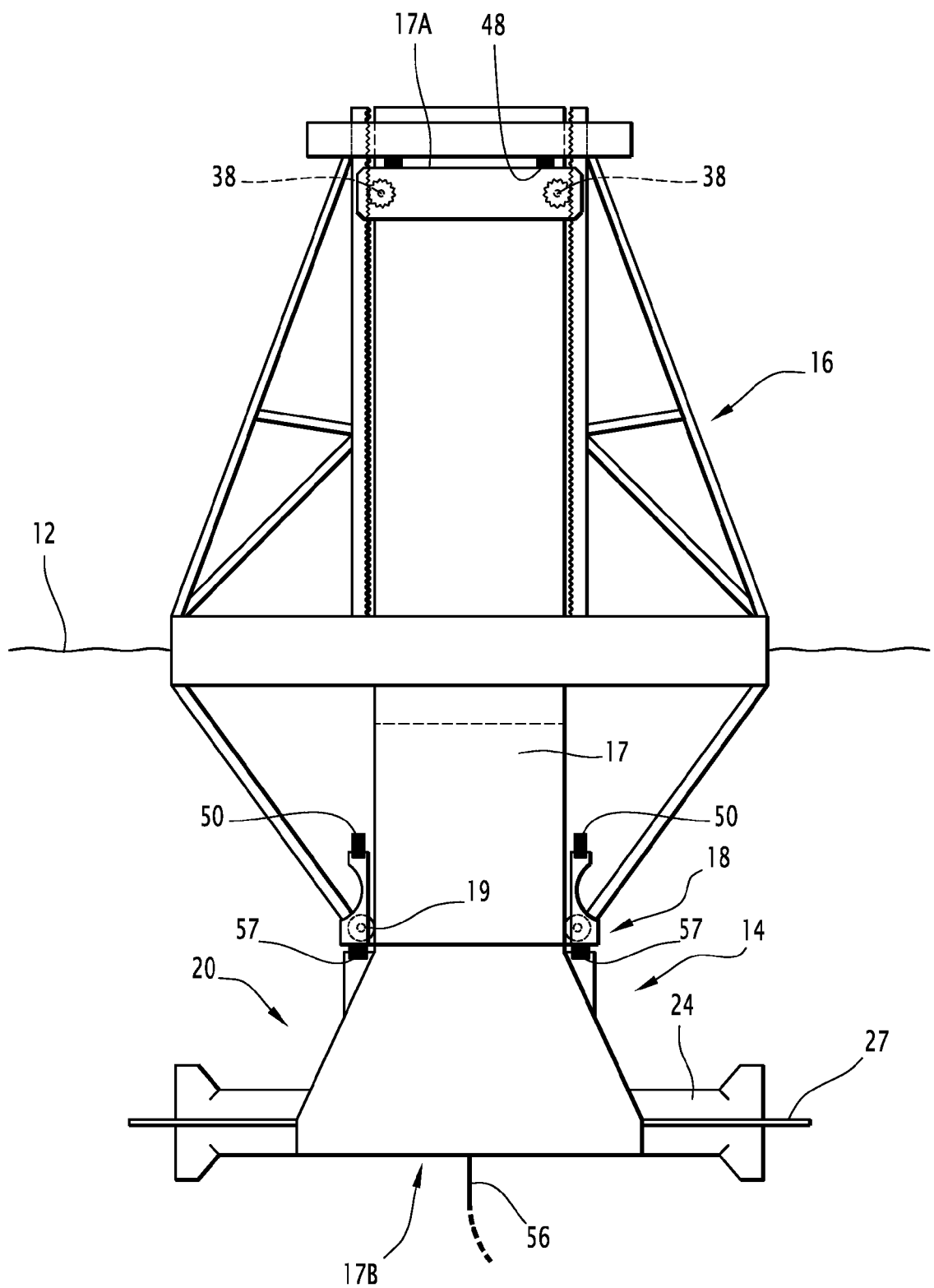
FIG. 7 is a view similar to FIG. 1 of the power conversion device of FIG. 1 in the retracted position for the transport and installation thereof on an expanse of water.

In order to position the device 10 on the expanse of water, said device is preferably arranged in the retracted position, as shown in FIG. 7.

Preferably, the upper end-of-travel stops 48 are retractable, so as to allow the movable member 16 to move to its lowest relative to the stationary member 14, for example until it comes into contact with the lower stops 47 supported by the mast 17 above the base 24. In this way, greater compactness of the device 10 is allowed during transport when said upper stops 48 are retracted.

The device 10 is thus towed, floating on the surface of the expanse of water owing to the floating element 40 and the sealed reservoir 30.

During this towing, the movable member 16 is immobilized relative to the stationary member 14, as shown in FIG. 7. For example, a braking element 58 of the power generation device 32 locks the rotor 36 in position.

When the device 10 is in a desired position on the expanse of water, the anchor lines 22 are to plate so as to anchor the device 10 at the bottom of said expanse of water.

The braking element 58 is then released, and the movable member 16 is thus released relative to the stationary member 14.

Preferably, the power generation device 32 can operate as a motor, or comprise a motor means, so as to bring the movable member 16 to the surface 12 of the expanse of water. In fact, the pinions 38 make it possible, when they are motor-driven, to actuate the racks 42 so as to move the movable member to a desired position.

In that case, the power generation device 32 preferably comprises a means for locking the free wheels 39, intended to be activated when the pinions are motor-driven, so that all of the pinions are active to move the movable member 16 during these installation operations.

To that end, it is possible to provide a reverser pinion capable of switching between a position in which it short circuits one of the free wheels, then connecting the corresponding pair of pinions 38 to the rotor 36, and a position in which said reverser pinion is inactive, the pair of pinions 38 then being connected to the rotor 36 only by the corresponding free wheel 39.

It will be noted that the pinions 38 make it possible, when they are motor-driven, to stress the movable member 16 in the lower position thereof relative to the stationary member 14, the stress being maintained owing to the braking element 58.

Figure 8:
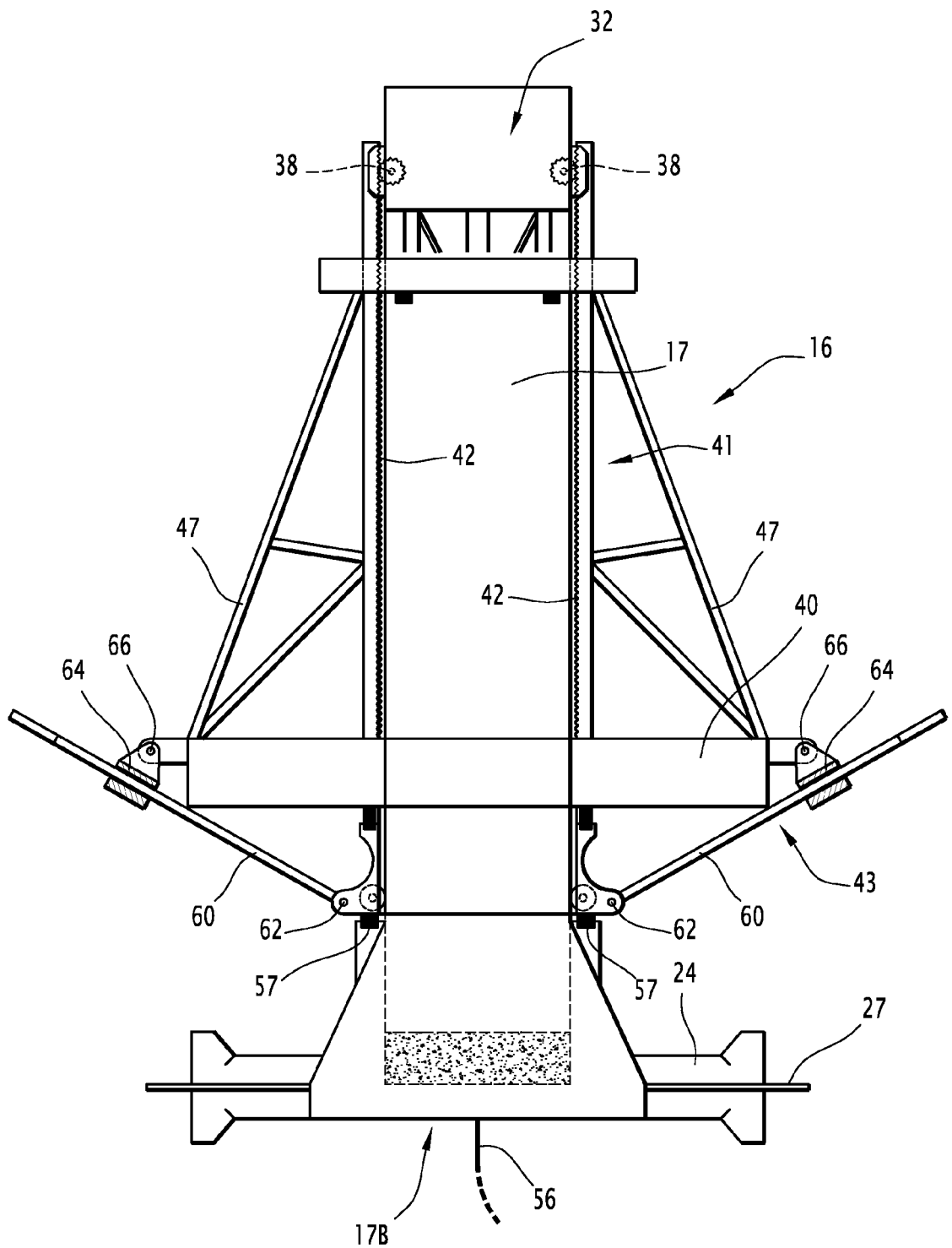
FIG. 8 is a view similar to FIG. 7 of a power conversion device according to a second embodiment of the invention, in the retracted position for the transport and installation thereof on an expanse of water.

FIG. 8 shows a conversion device 10 according to a second example of an embodiment of the invention. In this figure, the elements similar to those of the preceding figures are designated using identical references.

According to the second embodiment, the crosspieces 43 connecting the floating element 40 to the guiding element 18 have a variable length.

To that end, each crosspiece 43 comprises a rod 60, connected to the guiding element 18 using a pivot link 62, and sliding in a guide bush 64, said guide bush 64 being connected to the periphery of the floating element 40 using a pivot link 66.

The guide bush 64 comprises a means (not shown) for locking the rod 60 in position, intended to lock the sliding of the rod 60 in the guide bush 64 when said locking means is activated, and to allow said sliding when it is deactivated.

When the rod 60 slides in the guide bush 64, the length of the crosspiece varies, between the towing position, in which the guiding element 18 is relatively close to the floating element 40, and a usage position, in which the guiding element 18 is relatively distant from the floating element 40.

Owing to these length-adjustable crosspieces 43, it is possible to limit the draught of the device 10 during towing thereof, by decreasing the length of the crosspieces 43 as much as possible. In this way, the bulk of the device 10 is reduced during towing thereof.

Figure 9:
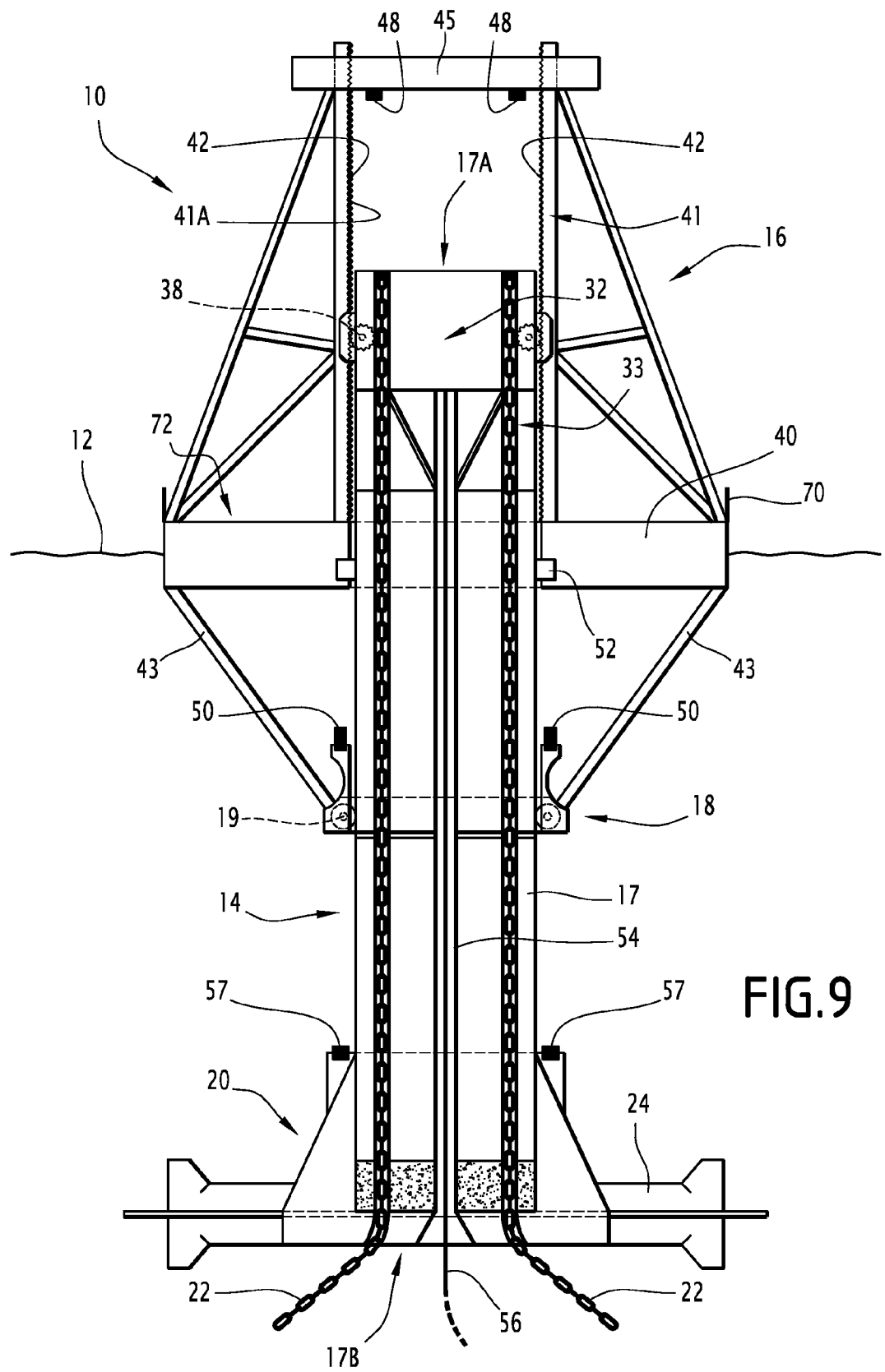
FIG. 9 is a view similar to FIG. 1 of the power conversion device according to a third embodiment of the invention.

FIG. 9 shows a conversion device 10 according to a third embodiment of the invention. In this figure, the elements similar to those of the preceding figures are designated using identical references.

According to this third embodiment, the floating element 40 comprises a peripheral partition 70, extending substantially vertically from the floating element 40, and delimiting an enclosure 72 with said floating element 40 and the mast 17. This enclosure 72 is open on top. The peripheral partition 70 comprises openings 74 for each provided with a check valve 76, allowing the passage of water from the enclosure 72 to the outside, and prohibiting the passage of water from the outside into the enclosure 72 through the openings 74.

Figure 10:
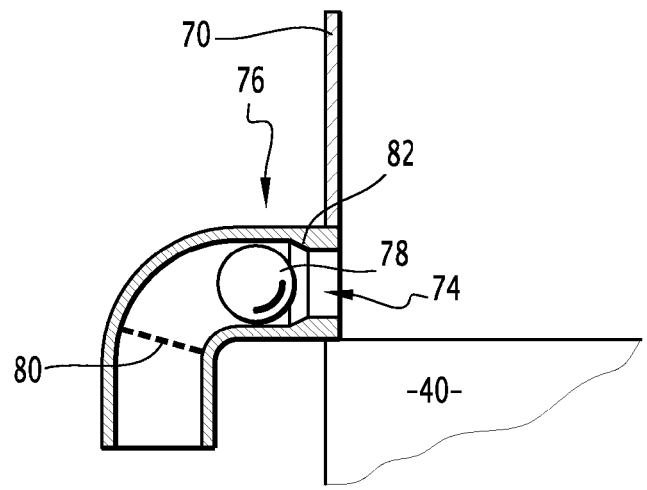
FIGS. 10 to 12 respectively show three alternatives of check valves equipping the conversion device of FIG. 9.
Figure 11:
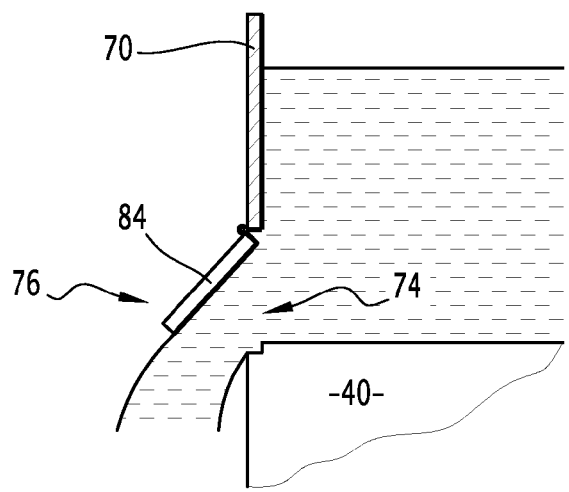
Figure 12:
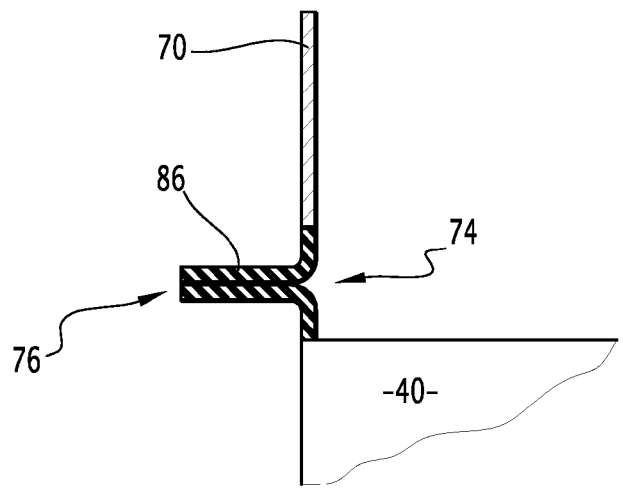

FIGS. 10 to 12 show three examples of check valves 76.

The check valve 76 shown in FIG. 10 comprises a ball 78 movable in a housing delimited by a grate 80 and an annular seal 82. When the ball 78 is driven by the water coming from the outside toward the enclosure 72, it cooperates with the annular seal 82 so as to sealably close the corresponding opening 74. On the other hand, when the ball 78 is driven by the water coming from the enclosure 72 toward the outside, it frees the seal 82 and is retained by the grate 80, and the water can pass through the seal 82 and said grate 80.

The valve 76 shown in FIG. 11 comprises a hatch 84. This hatch 84 can move between a closed position, in which it is driven by the water coming from the outside toward the enclosure 72, and an open position in which it is driven by the water coming from the enclosure 72 toward the outside.

The valve 76 shown in FIG. 12 comprises a circular flexible lip 86, of the "duckbill" type, extending between an open end on the contour of the corresponding opening 74 and a flat end. Traditionally, the water can only go from the open end to the flat end, i.e. from the enclosure 72 toward the outside.

It is also possible to consider any other type of valve only allowing water to pass from the enclosure 72 to the outside.

In the event of significant swells, the seawater may completely submerge the floating element 40. In that case, the water enters the enclosure 72 from the top, thereby forming an additional mass added to that of the floating element 40. This water mass therefore increases the force provided to the electric power generation means 32 when the floating element 40 descends along the mast 17, and therefore increases the generated electric power.

Owing to the valves 76, the water is discharged from the enclosure 72 during the lowering of the floating element 40, so that the water mass does not hinder the rise of the floating element 40 along the mast 17.

Preferably, enough openings 74 are provided to allow complete emptying of the enclosure 72 during the lowering thereof.

Advantageously, the partition 70 has a height chosen between one quarter and one half of the height of the floating element 40 in the vertical direction.

As an example, for a floating element 40 having a diameter of 24 m and a height of 3 m, and for a peripheral partition 70 having a height of 0.5 m, the enclosure 72 may receive a water mass of 225 tons.

The peripheral partition 70 therefore makes it possible to increase electricity production, with a relatively low additional cost.

It will be noted that the invention is not limited to the embodiments described above, and may assume alternatives without going beyond the scope of the claims.

In particular, it is possible to provide, between the pinions 38 and the rotor 36, a reversible drive system 80 as shown in FIGS. 13 to 15.

The drive system 80 comprises two input shafts 82, each input shaft 82 being connected on either side to a pinion 38, and being rotationally guided around its axis by traditional ball bearings 84.

The drive system 80 also comprises an output shaft 86, connected to the rotor 36, and rotationally guided around its axis by traditional ball bearings 88.

The input shafts 82 are kinematically connected to the output shaft 86 using first 90 and second 92 distinct meshing means, in particular shown in FIGS. 14 and 15, respectively.

The first meshing means 90 comprise a first toothed wheel 94, secured to the output shaft 86, and two first toothed free wheels 96, arranged on a respective input shaft 84. The first meshing means 90 also comprise two intermediate pinions 98, each meshing with a first respective toothed free wheel 96 and the first toothed wheel 94.

The first toothed free wheels 96 are adapted to rotate the intermediate pinions 98 when the input shafts 82 are rotated in a first direction of rotation, and to turn freely when the input shafts 82 are rotated in a second direction of rotation opposite the first.

Furthermore, the second meshing means 92 comprise a second toothed wheel 100, integral with the output shaft 86, and two second toothed free wheels 102, arranged on a respective input shaft 84, each of said second toothed free wheels 102 meshing with the second toothed wheel 100.

The second toothed free wheels 102 are adapted to drive the second toothed wheel 100 when the input shafts 82 are rotated in the second direction of rotation, and to turn freely when the input shafts 82 are rotated in the first direction of rotation.

When the input shafts 82 are rotated in the first direction of rotation, for example corresponding to raising the movable member 16 relative to the stationary member 14, the first meshing means 90 rotates the output shaft 86. On the other hand, when the input shafts 82 are rotated in the second direction of rotation, for example corresponding to lowering of the movable member 16 relative to the stationary member 14, the second meshing means 92 rotates the output shaft 86.

In this way, the output shaft 86, and therefore the rotor 36, is rotated continuously, independently of the variations in the direction of movement of the movable member 16 relative to the stationary member 14.

The invention claimed is:

1. A power conversion device for converting mechanical energy from a driven water mass of an expanse of water, such as a sea, into electric power, comprising:
   a substantially stationary member, including a stabilization means relative to the bottom of the expanse of water,
   a movable member movable relative to the stationary member, including at least one floating element for remaining on a surface of the expanse of water, such that the driven water mass moves said movable member,
   guiding means for guiding the movable member vertically relative to the stationary member, and
   a generator for generating electric power, arranged between the stationary member and the movable member, for converting into electric power the mechanical energy from a vertical motion of the movable member relative to the stationary member,
   wherein the stabilization means includes a damping base arranged at a lower end of the stationary member, and a ballast mass secured to the stationary member, the damping base including a peripheral skirt to contain the driven water mass.

2. The power conversion device according to claim 1, wherein the power generation means comprise:
   an electric power generator, including a stator supported by the stationary member, and a rotor supporting a pinion,
   at least one rack, supported by the movable member substantially vertically, intended to cooperate with the pinion to rotate the rotor when the movable member moves vertically relative to the stationary member.

3. The power conversion device according to claim 2, wherein the pinion is connected to the rotor by a free wheel mechanism supporting a flywheel.

4. The power conversion device according to claim 2, comprising a system for driving the rotor by means of the pinion, comprising:
   at least one input shaft connected to the pinion,
   an output shaft, connected to the rotor,
   first meshing means, comprising a first toothed wheel integral with the output shaft, and a first toothed free wheel arranged on the input shaft, and an intermediate pinion meshing with the first toothed free wheel and the first toothed wheel, the first toothed free wheel being adapted to rotate the intermediate pinion when the input shaft is rotated in a first direction of rotation, and to turn freely when the input shaft is rotated in a second direction of rotation opposite the first, and
   second meshing means, comprising a second toothed wheel friend, integral with the output shaft, and a second toothed free wheel, arranged on the input shaft, and meshing with the second toothed wheel, the second toothed free wheel being adapted to rotate the second toothed wheel friend when the input shaft is rotated in the second direction of rotation, and to turn freely when the input shaft is rotated in the first direction of rotation.

5. The power conversion device according to claim 2, wherein the movable member comprises a hollow tubular element, inside which the mast is housed, the hollow tubular element being delimited by an inner wall supporting the rack.

6. The power conversion device according to claim 1, wherein the guiding means includes:
   at least one substantially vertical mast, supported by the stationary member, and
   at least one complementary guiding element, supported by the movable member, forming a substantially vertical sliding connection with the mast.

7. The power conversion device according to claim 6, wherein the mast is hollow, and includes a passage for an electric output cable of the electric power generator.

8. The power conversion device according to claim 1, wherein the stabilization means includes an anchoring means at a bottom of the expanse of water.

9. The power conversion device according to claim 6, wherein the stabilization means includes an anchoring means at a bottom of the expanse of water, and wherein the anchoring means includes at least one anchoring line secured to an upper end of the mast, and extending along the mast as far as a lower end of the mast.

10. The power conversion device according to claim 2, wherein the stationary and movable members include complementary end-of-travel stops limiting the relative vertical movement of said stationary and movable members between deployed and retracted positions.

11. The power conversion device according to claim 10, comprising a motor-driven means intended to actuate the pinion so as to move the movable member toward the deployed position or the retracted position, the motor-driven means preferably being made up of the power generating means operating as a motor.

12. The power conversion device according to claim 1, wherein the buoyancy of the floating element is approximately equal to twice its weight, the floating element preferably having a general flat and circular or polygonal shape.

13. A power conversion device for converting the mechanical energy from a driven water mass of an expanse of water, such as a sea, into electric power comprising:
   a substantially stationary member, including a stabilization means relative to the bottom of the expanse of water,
   a movable member movable relative to the stationary member, including at least one floating element for remaining on a surface of the expanse of water, such that the driven water mass moves said movable member,
   guiding means for guiding the movable member vertically relative to the stationary member, and
   a generator for generating electric power, arranged between the stationary member and the movable member, for converting into electric power the mechanical energy from a vertical motion of the movable member relative to the stationary member,
   wherein the guiding means comprise:
   at least one substantially vertical mast, supported by the stationary member, and
   at least one complementary guiding element, supported by the movable member, forming a substantially vertical sliding connection with the mast,
   and wherein at least one crosspiece connects the floating element to the guiding element, said crosspiece comprising a rod, connected to the guiding element using a pivot link, and sliding in a guide bush, said guide bush being connected to the periphery of the floating element using a pivot link, so that the length of the crosspiece is adjustable.

14. A power conversion device for converting the mechanical energy from the a driven water mass of an expanse of water, such as a sea, into electric power, comprising:
   a substantially stationary member, including a stabilization means relative to the bottom of the expanse of water,
   a movable member movable relative to the stationary member, including at least one floating element intended for remaining on a surface of the expanse of water, such that the driven water mass drives the movement of said movable member,
   guiding means for guiding the movable member vertically relative to the stationary member, and
   a generator for generating electric power, arranged between the stationary member and the movable member, for converting into electric power the mechanical energy from a vertical motion of the movable member relative to the stationary member,
   wherein the guiding means comprise:
   at least one substantially vertical mast, supported by the stationary member, and
   at least one complementary guiding element, supported by the movable member, forming a substantially vertical sliding connection with the mast, and
   wherein the floating element comprises a peripheral partition, extending substantially vertically from said floating element, and delimiting an enclosure with said floating element and the mast, said enclosure being open on top.

15. The power conversion device according to claim 14, wherein the peripheral partition comprises openings each provided with a check valve, allowing the passage of water from the enclosure to the outside, and prohibiting the passage of water from the outside into the enclosure through said openings.

* * * * *